United States Patent
Copty

(10) Patent No.: US 12,527,623 B2
(45) Date of Patent: Jan. 20, 2026

(54) PRECISE ABLATION TREATMENT OF CANCER USING THE SYNERGETIC EFFECTS OF ELECTROMAGNETIC RADIATION WITH NANOPARTICLES

(71) Applicant: SYNERGYMED DEVICES INC., Lewes, DE (US)

(72) Inventor: Anan Copty, Jerusalem (IL)

(73) Assignee: SYNERGYMED DEVICES INC., Lewes, DE (US)

( * ) Notice: Subject to any disclaimer, the term of this patent is extended or adjusted under 35 U.S.C. 154(b) by 1075 days.

(21) Appl. No.: 17/417,969

(22) PCT Filed: Jan. 1, 2020

(86) PCT No.: PCT/IL2020/050003
§ 371 (c)(1),
(2) Date: Jun. 24, 2021

(87) PCT Pub. No.: WO2020/141527
PCT Pub. Date: Jul. 9, 2020

(65) Prior Publication Data
US 2022/0071702 A1 Mar. 10, 2022

Related U.S. Application Data

(60) Provisional application No. 62/787,792, filed on Jan. 3, 2019.

(51) Int. Cl.
*A61B 18/18* (2006.01)
*A61K 41/00* (2020.01)
(Continued)

(52) U.S. Cl.
CPC ...... *A61B 18/1815* (2013.01); *A61K 41/0052* (2013.01); *A61N 2/02* (2013.01);
(Continued)

(58) Field of Classification Search
CPC ..... A61B 18/1815; A61B 34/30; A61B 90/50; A61B 2018/00321; A61B 2018/00333;
(Continued)

(56) References Cited

U.S. PATENT DOCUMENTS 6,347,251 B1   2/2002   Deng
9,682,247 B2 *  6/2017  Susedik ................. A61N 1/406
(Continued)

FOREIGN PATENT DOCUMENTS

WO     2015066311 A1   5/2015

OTHER PUBLICATIONS

Kruse et al. (2011) A radio-frequency coupling network for heating of citrate-coated gold nanoparticles for cancer therapy: design and analysis, IEEE transactions on biomedical engineering, 58.17:2002-2012. Retrieved Nov. 18, 2021; doi: 10.1109/TBME.2011.2124460.
Sparchez et al. (2015) Old versus New-Tumor Ablation versus Tumor-Nanoablation with Particular Emphasis on Liver Tumors, Recent Advances in Liver Diseases and Surgery, 223, Chapter 9. Retrieved Nov. 18, 2021 from: https://www.intechopen.com/chapters/49065; DOI: 10.5772/61008.
(Continued)

*Primary Examiner* — Joanne M Rodden
*Assistant Examiner* — Dana Stumpfoll
(74) *Attorney, Agent, or Firm* — The Roy Gross Law Firm, LLC; Roy D. Gross

(57) ABSTRACT

The present disclosure is directed to systems, device and methods for cancer ablation treatment of human and animal subjects through the application of a combination of electromagnetic sources, in particular, microwave and radio frequency radiation that are focused on a tumor harboring magnetic or other metallic nanoparticles to result in synergetic heating effect whereby the tumor is heated to ablative temperature due to the strong absorption of the nanoparticles while the surrounding healthy tissue is hardly affected.

11 Claims, 4 Drawing Sheets

(51) Int. Cl.
| | |
|---|---|
| *A61N 2/02* | (2006.01) |
| *A61N 5/02* | (2006.01) |
| *A61B 18/00* | (2006.01) |
| *A61B 34/30* | (2016.01) |
| *A61B 90/50* | (2016.01) |
| *A61N 2/00* | (2006.01) |

(52) U.S. Cl.
CPC ............ *A61B 2018/00321* (2013.01); *A61B 2018/00333* (2013.01); *A61B 2018/00452* (2013.01); *A61B 2018/00541* (2013.01); *A61B 2018/00547* (2013.01); *A61B 2018/00577* (2013.01); *A61B 2018/00648* (2013.01); *A61B 2018/0066* (2013.01); *A61B 2018/00702* (2013.01); *A61B 2018/00714* (2013.01); *A61B 2018/00732* (2013.01); *A61B 2018/00785* (2013.01); *A61B 2018/00797* (2013.01); *A61B 2018/00809* (2013.01); *A61B 2018/00886* (2013.01); *A61B 2018/00994* (2013.01); *A61B 2018/1861* (2013.01); *A61B 2018/1869* (2013.01); *A61B 34/30* (2016.02); *A61B 90/50* (2016.02); *A61N 2/002* (2013.01); *A61N 2/004* (2013.01); *A61N 5/025* (2013.01)

(58) Field of Classification Search
CPC ........... A61B 2018/00452; A61B 2018/00541; A61B 2018/00547; A61B 2018/00577; A61B 2018/00648; A61B 2018/0066; A61B 2018/00702; A61B 2018/00714; A61B 2018/00732; A61B 2018/00785; A61B 2018/00797; A61B 2018/00809; A61B 2018/00886; A61K 41/0052; A61N 2/02; A61N 1/406
See application file for complete search history.

(56) References Cited

U.S. PATENT DOCUMENTS

| | | | |
|---|---|---|---|
| 2003/0028071 A1* | 2/2003 | Handy | A61N 1/406 600/12 |
| 2003/0028271 A1* | 2/2003 | Peterson | D06F 34/08 700/83 |
| 2005/0251234 A1* | 11/2005 | Kanzius | A61N 1/406 607/101 |
| 2006/0142748 A1 | 6/2006 | Foreman et al. | |
| 2008/0281318 A1* | 11/2008 | Herbette | A61N 1/406 606/41 |
| 2011/0034916 A1 | 2/2011 | Te et al. | |
| 2011/0034974 A1 | 2/2011 | Munoz et al. | |
| 2011/0098558 A1 | 4/2011 | Weaver et al. | |
| 2016/0310594 A1 | 10/2016 | Kim et al. | |
| 2017/0165003 A1 | 6/2017 | Schoenbach et al. | |
| 2017/0265803 A1* | 9/2017 | Copty | A61B 5/0036 |
| 2018/0050218 A1* | 2/2018 | Copty | A61B 5/0077 |

OTHER PUBLICATIONS

Gannon et al. (2007) Carbon nanotube enhanced thermal destruction of cancer cells in a noninvasive radiofrequency field, Cancer: Interdisciplinary International Journal of the American Cancer Society, 110.12:2654-2665. Retrieved Nov. 18, 2021; DOI 10.1002/cncr.23155.

PCT International Search Report for International Application No. PCT/IL2020/050003, mailed Apr. 7, 2020, 7pp.

PCT Written Opinion for International Application No. PCT/IL2020/050003, mailed Apr. 7, 2020, 7pp.

PCT International Preliminary Report on Patentability for International Application No. PCT/IL2020/050003, issued Jun. 16, 2021, 8pp.

* cited by examiner

PRECISE ABLATION TREATMENT OF CANCER USING THE SYNERGETIC EFFECTS OF ELECTROMAGNETIC RADIATION WITH NANOPARTICLES

CROSS REFERENCE TO RELATED APPLICATIONS

This application is a National Phase of PCT Patent Application No. PCT/IL2020/050003 having International filing date of Jan. 1, 2020, entitled "PRECISE ABLATION TREATMENT OF CANCER USING SYNERGETIC EFFECTS OF ELECTROMAGNETIC RADIATION WITH NANOPARTICLES", which claims the benefit of priority under 35 U.S.C. § 119 (e) of U.S. Provisional Application No. 62/787,792, filed on Jan. 3, 2019, entitled "PRECISE ABLATION TREATMENT OF CANCER USING SYNERGETIC EFFECTS OF ELECTROMAGNETIC RADIATION WITH NANOPARTICLES". The contents of the above applications are all incorporated by reference as if fully set forth herein in their entirety.

TECHNICAL FIELD

The present disclosure generally relates to the field of cancer treatment. In particular, the present disclosure relates to systems, devices and methods utilizing various types of electromagnetic radiation together with nanoparticles, for ablating tumors.

BACKGROUND

Cancer has become one of the leading causes of death in many regions of the world. One of the main reasons for cancer growth is associated with aging, as people are living longer lives and, as such, are more prone to develop cancer with age. For superficial cancer tumors or localized tumors that have not metastasized, the main treatment approach is the resection of tumors, where the tumor is completely removed through surgery along with a margin ranging from 2-10 mm around the tumor region. In some cases, as in breast cancer, the entire breast is sometimes removed (mastectomy) or partial breast surgery (lumpectomy) is performed. In the case of head and neck cancers, removing for example the tongue and later replacing it with an alternative skin from the body, can have difficult life-style impact on the patients. There are also regions where it is very difficult to treat cancer through surgery, as in brain cancer in its many forms, including glioblastoma where administering radiation therapy has not been very effective.

Surgical resection of cancer tumors is not applied only to human cancer patients but to pets at veterinary clinics and hospitals. A viable alternative to surgery for early stage tumors of pets is not available. The demand by pet owners for better quality treatment for their pets is on the rise.

Existing ablation technologies are typically invasive, where the antenna or applicator is placed inside the cancer tumor through image guidance. The tumor and surrounding tumor margins are treated locally. But, this treatment is not dependent on the shape of the tumor and more dependent on the temperature mode of operation (heating or cooling in case of cryoablation) profile of the applicator. As a result ablation technology becomes only relevant to specific cases where surgery cannot be performed or where applying ionizing radiation therapy may be harmful (such as the case if the tumor is close to the heart). Moreover, for the precise placement of the applicator, image guidance is required which can significantly increase the cost of the procedure.

Some of the issues with conventional ablation devices include (1) lack of selectivity in treating the tumor. The applicators in a conventional ablation system are invasive, heat from the inside (center of the tumor) out, and, has their own heating pattern as the heat distribution does not depend on the shape of tumor. In other words, the invasive applicators that are used do not selectively heat the tumor without damaging the surrounding tissue. In addition, as the applicators are placed directly inside the tumor, (2) they require image guided modalities to place them in the correct spot. (3) Many types of applicators heat up not only at the tip where the electromagnetic radiation is focused, but also along the applicator shaft, which goes inside the tissue and can end up heating the healthy tissue. Therefore, insulating material around the ~1 cm diameter of the applicator shaft is often used. (4) As the applicator is very small in size, its energy transmission properties is not very efficient and, therefore, requires many tens of Watts of energy up to even over 1000 Watts in some cases. (5) If the applicator is based on radio frequency, there needs to be a grounding pad as well, which complicates the local energy deposition process. Therefore, microwave based ablation devices are becoming more popular due to their energy efficiency and as they do not require grounding. But, microwave energy is limited in penetration depth and have mainly been applied invasively.

Thus, there is a need in the art for non-surgical approach to treat cancer that can further preserve the body shape, does not have cosmetic changes and short in duration, and which overcomes the shortcoming of currently used ablation devices, and in particular allow selective treatment of tumors without damaging the healthy tissue and without a need for guided imaging.

SUMMARY

According to some embodiments, there are provided advantageous systems, devices and methods for specific and selective treatment of cancer, which allow selective ablation of tumor tissues, where the systems and methods allow safe ablation of the tumor, without damaging neighboring tissues and without a need for guided imaging. In some embodiments, the systems, devices and methods provide non-surgical means to treat cancer, which are short in duration, preserve the body shape, do not induce cosmetic changes, selective, safe and cost efficient.

According to some embodiments, there are provided devices, systems and methods for cancer ablation treatment of human and animal subjects through the application of a combination of electromagnetic sources, namely microwave and radio frequency radiation that are focused on a tumor containing/harboring magnetic or other metallic nanoparticles. The combination of the two electromagnetic sources focused on the nanoparticles allow for a synergetic heating effect whereby the tumor is heated to ablative temperatures due to the strong absorption of the nanoparticles found in the tumor while the surrounding healthy tissue with no nanoparticles is slightly or not affected at all.

According to some embodiments, there are provided advantageous ablation device and system to treat localized solid cancer tumors, which obviates the need to perform surgical resection. In some embodiment, the device and system are based on an ablation method that can allow ablating and destroying tumors, precisely, selectively and with minimal or no damage to surrounding healthy tissue, by utilizing a combination of both radiofrequency (RF) and Microwave (MW) radiation and specific nanoparticles.

According to some embodiments, the systems, devices and methods disclosed herein make use of interaction mechanisms of microwave and radio frequency radiation with body tissues, in combination with suitable nanoparticles. According to some embodiments, suitable nanoparticles are introduced (for example, by being injected) into the tumor and interact/attach/introduced specifically to the cancer tumor cells and tissue.

According to some embodiments, radio frequency (RF) coils can produce an inductive heating mechanism inside the nanoparticles harbored in the tumor or tumor cells through the alternating magnetic field they produce.

According to some embodiments, the combination of RF and Microwave is advantageous as it adds more degrees of freedom for the heating process, as compared to when using a single source of radiation. According to some exemplary embodiments, for example, microwave penetration depth may be limited to a few centimeters inside the tissue while RF frequency can penetrate very deep and cover the entire body depth. However, RF radiation is not very well-focused and at high energies, will cause Eddy currents in the skin surface and cause unwanted heat in the tissue. Thus, in accordance with some embodiments, with an appropriate balance between RF and Microwave radiation, it is possible to heat effectively and specifically the nanoparticles harbored inside the tumor, without causing any undesired heating to healthy tissue, which do not include the nanoparticles.

According to some embodiments, the systems, devices and methods disclosed herein are suitable for any solid cancer tumor in human or animal, including such tumors as, but not limited to: head & neck cancer, breast cancer, lung cancer, skin cancer, prostate cancer and the like.

According to some embodiments, there is thus provided a device for ablation-based cancer treatment, the device includes: at least one Radio Frequency (RF) coil configured to generate alternating magnetic fields at RF frequencies, wherein said RF coil comprises a core material having a magnetic permeability of air or a magnetic permeability higher than air; at least one microwave antenna configured to generate maximal specific loss power (SLP) in a tumor region of a subject and minimal SLP in a healthy tissue which is in proximity to the tumor region, wherein the RF and microwave electromagnetic waves are configured to be absorbed by metallic nanoparticles configured to be selectively accumulated in the tumor region; and a control circuitry configured to: provide an electrical signal at RF frequencies to said RF coil, thereby define properties of the electromagnetic waves generated by said RF coil; provide an electrical signal at microwave frequencies to said microwave antenna, thereby define properties of the electromagnetic waves generated by said microwave antenna; obtain temperature information from a sensor located in the tumor region and from a sensor located in the healthy tissue; and adjust one or more properties of the RF and/or microwave generated electromagnetic waves based on the obtained temperature information.

According to some embodiments, the at least one MW antenna may be an inductive circular loop. According to some embodiments, the at least one MW antenna may be a flat Archimedean antenna. According to some embodiments, the at least one MW antenna may be a spiral antenna. According to some embodiments, the at least one MW antenna may be a zig-zig antenna . . . . According to some embodiments, the at least one MW antenna may be a resonator antenna.

According to some embodiments, the at least one MW antenna may include a coaxial inductive antenna that is invasive or minimally invasive. According to some embodiments, an active tip of the MW antenna may be placed inside the tumor, either directly or through an endoscope.

According to some embodiments, the device may include an array of microwave antennas that may be different, similar or identical with respect of size, shape, composition, and the like.

According to some embodiments, the RF coil may be a Helmholtz Coil. In some embodiments, the RF coil may be a solenoid Coil. In some embodiments, the RF coil may be a Helmholtz Coil with soft iron core. According to some embodiments, the RF coil may be a solenoid Coil with soft iron core.

According to some embodiments, the device may further include a dielectric plane placed adjacent to said at least one RF coil and at least one MW antenna and configured to reduce radiation, not directed to the target area.

According to some embodiments, the thermal sensor may include a temperature optical fiber configured to measure the temperature of the tumor, and/or other surrounding tissue, and provide a feedback signal to the control circuitry.

According to some embodiments, the radiated electromagnetic waves may have a frequency in the range of about 100 KHz to 6 GHz.

According to some embodiments, there is provided a system for ablation-based cancer treatment which includes the device as disclosed herein and one or more displays configured to display one or more operating parameters of the device.

According to some embodiments, there is provided a method for ablation treatment of cancer tumors, the method includes: providing Radio Frequency (RF) electromagnetic radiation and a microwave electromagnetic radiation to heat and damage localized tumors, utilizing at least one RF source and at least one microwave antenna, placed noninvasively in the vicinity of a region of a tumor of a subject, said tumor comprises nanoparticles administered to the subject; activating the at least one RF source and the at least one microwave antenna to produce electromagnetic radiation, where the magnetic flux density of the electromagnetic radiation induced by the RF source is about 50 Gauss or more; measuring temperature rise caused by the RF and the microwave radiation by thermal sensors placed in the tumor tissue and in a healthy tissue which is in close proximity of the tumor tissue; and adjusting the radiation parameters based on the temperature measurements such that the heating parameters, selected from temperature, power, and frequency are adjusted to allow heating the tumor tissue to a maximal specific absorption rate (SAR) and with having minimal SAR in the surrounding healthy tissue.

According to some embodiments, the method may further include measuring cumulative exposure minutes (CEM).

According to some embodiments, the parameters of the radiated electromagnetic waves may include intensity, wavelength and/or intermittency.

According to some embodiments, the radiated electromagnetic waves may have a frequency in the range of 100 KHz to 6 GHz. In some embodiments, the radiated electromagnetic waves may have a frequency in the range of 100 KHz to 200 MHz. In some embodiments, the radiated electromagnetic waves may have a frequency in the range of 300 MHz to 1000 MHz. In some embodiments, the radiated electromagnetic waves may have a frequency in the range of 1 GHz to 6 GHz.

According to some embodiments, the Specific Loss Power (SLP) inside the tumor region is higher than that of the healthy tissue. In some embodiments, the SLP may be optimized using a combination of minimal electric field and maximal magnetic field of the applied RF radiation. In some embodiments, the SLP may be optimized using a combination of electric and magnetic fields in the microwave radiation.

According to some embodiments, adjusting the radiation parameters is achieved by a control circuitry.

According to some embodiments, the nanoparticles are magnetic or metallic. According to some embodiments, the nanoparticles are pre-administered to the subject by localized administration or systemic administration.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

Examples illustrative of embodiments are described below with reference to figures attached hereto. In the figures, identical structures, elements or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

FIG. 1B-A schematic illustration of a system for cancer ablation treatment, according to some embodiments;

DETAILED DESCRIPTION

Figure 1A:
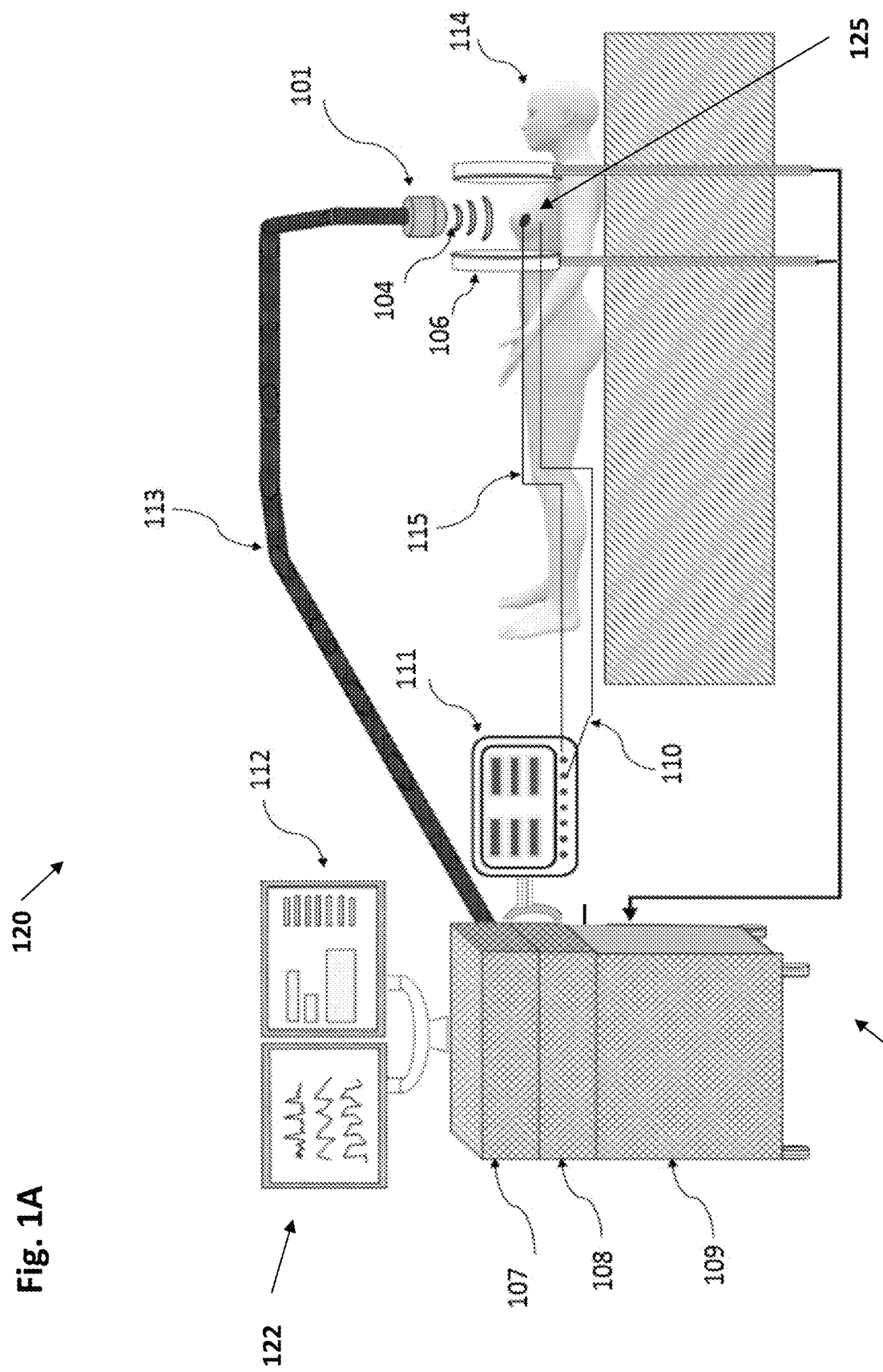
FIG. 1A A schematic illustration of a system for cancer ablation treatment, according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

According to some embodiments, there are provided advantageous ablation device and system to treat localized solid cancer tumors, which obviates the need to perform surgical resection. In some embodiment, the device and system are based on an ablation method that can allow ablating and destroying tumors, precisely, selectively and with minimal or no damage to surrounding healthy tissue, by utilizing a combination of both RF and Microwave radiation and specific nanoparticles. Without wishing to be bound to any theory or mechanism, the systems, devices and methods disclosed herein make use of interaction mechanisms of microwave and radio frequency radiation with body tissues, in combination with suitable nanoparticles. According to some embodiments, suitable nanoparticles are introduced (for example, by being injected) into the tumor and interact/attach/introduced specifically to the cancer tumor cells and tissue. This may be achieved by two optional routes: (1) Intratumoral injection: where the nanoparticles are directly injected into or inside the tumor and/or (2) Systemic (for example, Intravenous) administration: where the particles are administered (for example, injected intravenously) into the blood and eventually reach the tumor via, for example, the enhanced permeability and retention (EPR) effect. Again, without wishing to be bound to any theory or mechanism, the blood vessels that feed the tumor are porous in nature where the nanoparticles, engineered precisely at a desired, corresponding size (for example, below 300 nm), can penetrate into the tumor through these pores. With EPR effect, such the nanoparticles can accumulate inside the tumor. As the immune system of the tumor is weak, the nanoparticles may be retained/localized within the tumor. In some embodiments, of intratumoral administration (for example, by injection) can be advantageous whereby a high nanoparticle concentration can be achieved within the tumor which can improve ablation efficiency. In some embodiments, intravenous administration is advantageous as it allows for a more homogenous distribution of nanoparticles and does not require a priori knowledge of the location of the tumor or image guidance for precise direct injection. According to some embodiments, various nanoparticles may be utilized. For example, in some embodiments, FDA approved nanoparticles, such as iron oxide particles may be administered into the tumor. In some embodiments, gold or other custom made nanoparticles (which are safe for use with respect of toxicity or any other parameters) may be used as well.

According to some embodiments, Radio frequency (RF) coils can produce an inductive heating mechanism inside the nanoparticles harbored in the tumor or tumor cells through the alternating magnetic field they produce. According to some embodiments, the typical value of the magnetic field flux density may be higher than 50 Gauss in order to produce substantial heating of the nanoparticles. According to some embodiments, and without wishing to be bound to any theory or mechanism, different physical mechanisms that control the heating process of magnetic nanoparticles may include: (1) Hysteresis losses (2) Neel or Brownian relaxation, and (3) Viscous Losses. (1) Hysteresis Losses: depend on the magnetic hysteresis properties of the nanoparticles. The particle size, shape and microstructure have a strong influence on the amount of hysteresis heating which is a measure of energy dissipation of magnetization reversal when applying an alternating magnetic field. The hysteresis loss and thermal characteristics of magnetic nanoparticles are different from bulk material due to an increase in surface-to-volume ratios for nanoparticles. The loss is dominant in multi-domain particles where the magnetic coercivity and remanence are higher. (2) Neel and Brownian Relaxation: when the particle size is decreased, the energy barrier for magnetization reversal also decrease and thermal fluctuations lead to a relaxation phenomenon. At a finite temperature, there is a finite probability for the magnetization to flip and reverse its direction. The mean time between two flips is referred to as the Néel relaxation time and is given by the ratio of the anisotropy energy KV to the thermal energy kT $$\tau_N = \tau_0 \exp[KV/(KT)], (\tau_0 \sim 10^{-9} s)$$

When the particles are suspended in a fluid suspension with a viscosity n, an additional relaxation mechanism occurs due to reorientation of the whole particle which is known as Brownian relaxation with the characteristic relaxation time $$\tau_B = 4\pi\eta r_h^3/(kT)$$

where $r_h$ is the hydrodynamic radius of the particle. It is difficult to distinguish the contribution of each mechanism. But, in general, Neel relaxation dominates when nanoparticles are less than 20 nm, and Brownian relaxation dominates when the nanoparticles are larger than 20 nm. The imaginary part of the complex susceptibility $\chi''$ (f) of the collective ensemble of the magnetic nanoparticles is related to magnetic losses by $$\chi''(f) = \chi_0 \varphi(1+\varphi^2), \varphi = f\tau_{N,B}\chi_0 = \mu_0 M_S^2 V/(KT)$$

where $M_S$ is the saturation magnetization, f is the applied frequency and $\mu_0$ is the magnetic permeability of free space. The power loss density (PLD), measured in watts per volume is related to the complex susceptibility by the following $$P(f,H) = \mu_0 \pi \chi''(f) H^2 f$$

Where H is the applied magnetic field of the applicator.

Viscous Losses: Heat generation is caused due to the Brownian motion of the nanoparticles inside the viscous solution when a strong applied rotating magnetic field is present. A magnetic torque of the nanoparticles is present due to the applied field and acts against the viscous solution. This rotational friction with the surrounding solution causes heat generation.

The microwave radiation also heats the nanoparticles through ferromagnetic resonance absorption when the particles are magnetic. The mechanism of heating through microwaves is based on a combination of dielectric heating and magnetic heating as the wave has both an electrical and magnetic field components. The power dissipation due to the microwave field is given by $$P = \frac{1}{2}\sigma|E|^2 + \pi f \varepsilon_0 \varepsilon''|E|^2 + \pi f \mu_0 \mu''|H|^2$$

In this equation $\sigma$ is nanoparticle conductivity, E is the electric field part of the microwave beam, f is the applied microwave frequency, $\varepsilon_0$ is the permittivity of free space and $\varepsilon''$ is the imaginary part of the relative permittivity, $\mu_0$ is the magnetic permeability of free space and $\mu''$ is the imaginary part of the relative permeability.

According to some embodiments, the combination of RF and Microwave is advantageous as it adds more degrees of freedom for the heating process, as compared to when using a single source of radiation. According to some exemplary embodiments, for example, microwave penetration depth may be limited to a few centimeters inside the tissue while RF frequency can penetrate very deep and cover the entire body depth. However, RF radiation is not very well-focused and at high energies, will cause Eddy currents in the skin surface and cause unwanted heat in the tissue. Thus, in accordance with some embodiments, with an appropriate balance between RF and Microwave radiation, it is possible to heat effectively and specifically the nanoparticles harbored inside the tumor, without causing any undesired heating to healthy tissue, which do not include the nanoparticles.

According to some embodiments, the systems, devices and methods disclosed herein are suitable for any solid cancer tumor in human or animal, including such tumors as, but not limited to: head and neck cancer, breast cancer, lung cancer, skin cancer, prostate cancer and the like.

According to some embodiments, in order to validate that the tumor is heated maximally, while the surrounding healthy tissue is minimally heated, it is desirable to increase the specific loss power (SLP) inside the tumor and minimize it outside of the tumor. As used herein, the specific loss power is defined as:

$$SLP = \frac{<P>}{\phi\rho}$$

where P is the energy dissipation per unit mass of the nanoparticles, $\Phi$ is volume fraction of the nanoparticles with respect to the suspending tissue, $\rho$ is the density of the suspending tissue.

According to additional embodiments, another parameter similar in nature and used frequently for assessing the dosage of the electromagnetic energy inside the tissue is a specific absorption rate (SAR), measured as the electromagnetic power per mass at the specific location of the tissue where SAR is defined as $$SAR = \frac{SLP}{\rho}$$

According to some embodiments, international standards are used to protect people from high SAR exposure values inside the body, however, in the case of cancer tumors and for the treatment purposes, it is desirable to maximize the SAR value inside the tumor and minimize it in the surrounding tissue.

In common thermal ablation methods for cancer treatment, the cancerous tissue is heated to elevated temperatures far above normal body temperature, to damage and kill the cancer cells. In the case of cryoablation, the tumors are in fact frozen to kill cells. Common heating ablation treatment methods include microwave or radio frequency invasive applicators that heat cancer tissues through radiating the area with electromagnetic waves. The drawback to these methods is that the cancerous as well as the non-cancerous tissues surrounding the cancer cells absorb the radiation and are also heated. These applicators have their own heating profile and are not dependent on the cancer tumor shape. Therefore, besides the desired effect of damaging cancer cells, undesired damage may also occur as a result of the non-targeted heating.

Additionally, some of the common cancer ablation treatment methods do not provide accurate control over the heating of the cancer cells. The heating is not well-quantified and the temperature distribution may not be uniform across the tumor. As a result, under-exposure or over-exposure may occur. Under-exposure will result in an incomplete treatment of the tumor and overexposure may be severely damaging to healthy tissue. The general approach for the determination of the these conditions through a metric known as the cumulative equivalent minutes at 43° C. (CEM43° C.) where this metric depends linearly on time and exponentially on temperature. The CEM43° C. is essentially a number that expresses a desired dose for a specific biological end point. It may be used both for determining the treatment dosage and the safety dosage for patients.

$$CEM43°\,C. = \sum_{i=1}^{n} ti \cdot R^{(43-Ti)}$$

where $t_i$ is the i-th time interval, T is the average temperature during time interval $t_i$, and R is a constant equal to 0.25 for T<43° C. and 0.5 for T>43° C. The 43° C. temperature is referring to hyperthermia treatments that are performed at or near this temperature. Thermal damage to biological tissues can occur through apoptosis or necrosis depending on the temperature and the exposure time. Using the CEM as a benchmark for evaluating exposure, is a critical process for obtaining repeatable treatment results and safety of the healthy tissue.

On top of all that, the power consumption of common ablation treatment systems that use RF or MW energies is typically high ranging from 40 W to 2000 W and may require special safety considerations for providing the treatment. These applicators are also invasive in nature and require image guidance for treating sub-surface tumors.

According to some embodiments, there are provided herein devices, systems and methods for cancer ablation treatment, utilizing the combination of RF coils and MW applicator(s) configured to provide a combination of electromagnetic radiation to metallic based nanoparticles located on/in/near cancer tissue to heat those nanoparticles and thereby heat the cancer tissue that they are contained or harbored within.

According to some embodiments, the temperature of the cancer tissue containing the nanoparticles is measured via thermal sensors, such as, optical fiber thermal sensors or other thermal sensors that are immune to the exposure of the electromagnetic radiation, and the radiation intensity is adjusted to prevent overheating or under-heating of the cancer tissue, advantageously resulting in a more effective treatment of the cancer cells.

According to some embodiments, the temperature of the healthy tissue nearby the cancer tissue is measured through thermal sensors and the radiation intensity is adjusted to prevent overheating of the cancer tissue, advantageously resulting in a more effective control of the healthy tissue from damage.

As used herein and throughout the application, the terms "metallic nanoparticles" refers to "magnetic nanoparticles", "Superparamagnetic nanoparticles" and "nonmagnetic nanoparticles" such as gold or silver, and refer to a class of particles ranging between 1 and 100 nanometers in size, and each particle behaves as a whole unit with respect to its transport and properties, and they can be manipulated using magnetic field gradients if the particles are magnetic. According to some embodiments, other particle sizes may apply, such as pico-particles, micro-particles and others. According to some embodiments, the size of the metallic nanoparticles is in the range of 5 nanometer to 80 nanometer. According to some embodiments, the size of the metallic nanoparticles is in the range of 10 nanometer to 60 nanometer. According to some embodiments, the size of the metallic nanoparticles is in the range of 5 nanometer to 40 nanometer. According to some embodiments, the size of the metallic nanoparticles is in the range of 100 nanometer to 1000 nanometer.

In some embodiments, the nanoparticles are used for tissue specific targeting, namely cancer tissue targeting, such that when they are introduced to a region having cancerous tissue and other tissues, the nanoparticles will specifically target the cancer tissue and attach thereto.

According to some embodiments, providing the metallic nanoparticles to a target area within cancer tissue may result in having the particles attach selectively to cancer tissue and not to other tissues that may be in the target area.

According to some embodiments, when the metallic nanoparticles are heated by exposure to an alternating magnetic fields of RF energy by absorbing the magnetic energy, the cancer tissue that contains or in close proximity to the metallic nanoparticles is heated as well, and a cancer ablation treatment may be facilitated.

Figure 1B:
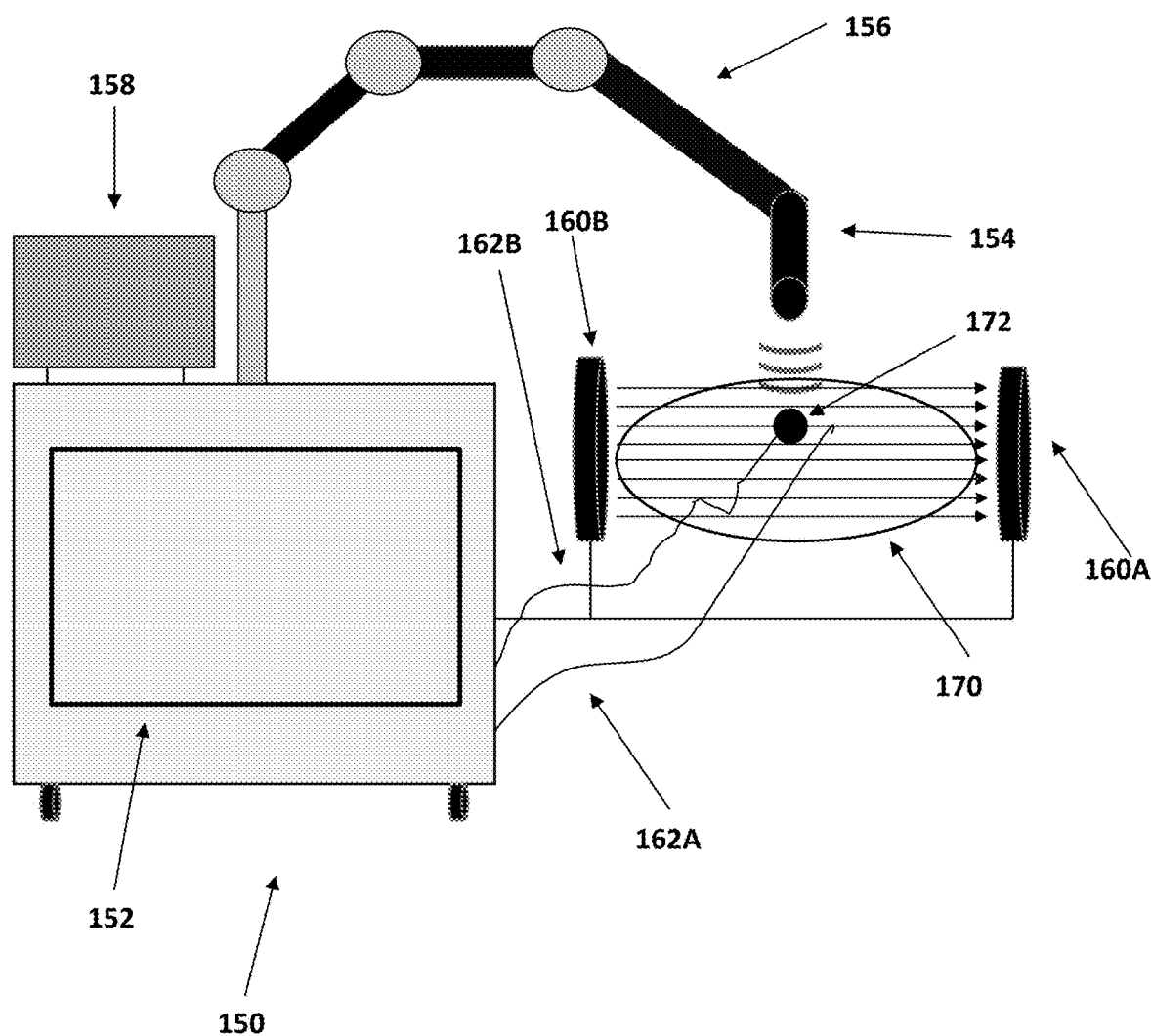

Reference is now made to FIG. 1A, which schematically illustrates a system for cancer ablation treatment, according to some embodiments;. As shown in FIG. 1A, system 120 includes a device 121 which can provide two types of radiation sources to eventually heat a tumor (tumor tissue or tumor cells) harbored in a subject. As shown in FIG. 1A, a subject 114, having a tumor 125 (for example, at a breast tissue) is being treated by system 120. Device 121 includes Radio frequency coils 106 and RF source (generator) 107, as well as microwave antenna 101 and corresponding microwave generator (source) 109, which are configured to produce the respective radiations. The device allows positioning the radiation sources at a correct location relative to the subject body and relative to the tumor to be treated. In some embodiments, a movable arm 113 (which can be a robotic arm in some examples) is used for aiding in the placement of at least some of the radiation sources. The subject is introduced (systemically, or by directed administration) with metallic nanoparticles, prior to being treated with the radiation sources, wherein the nanoparticles are configured to absorb the radiation sources, heat up within the tumor or tumor cells, and, in consequently heat the tumor. The device further includes one or more fibers 110 (such as optical fibers) with GaAs heat sensors or other thermal sensors connected to a thermal conditioner 111 that may not be impacted by electromagnetic radiation 104. The optical fibers may be placed inside the tumor and inside surrounding tissue, to monitor the internal temperature therein. According to some embodiments, one or more processors (including, memory modules, processors, RAM and ROM components), 112 are used to control operation of the RF source, MW source, and/or thermometers, for example, via suitable algorithms that can control the combined heating process such that the required heat dose (CEM) may be received within the tumor, while the surrounding tissue receives minimal dose. In some embodiments, microwave energy 107 and RF energy 109 sources are connected to and controlled by the one or more processors. In some embodiments, the device may include additional electronics 108, including such components as, but not limited to: RF attenuators and power meters which are used in combination, to monitor the energy transmission and reflection. The data thus obtained can provide suitable feedback to the processors, where the algorithms can control the heating process. In some embodiments, the additional electronics 108 mays also include RF and MW amplifiers to produce a more powerful signal. In some embodiments, the system may include one or more displays 122, configured to display some or all of the operating parameters (such as, frequencies, temperature, power, time, etc.) and/or any suitable measured parameters (such as, internal temperature, power, etc.). In some embodiments, the system may include a user interface allowing an operator to control one or more operating parameters of any of the components of the system, including, the RF source, MW source, thermometers, and the like, or any combination thereof. Reference is now made to FIG. 1B, which is a schematic illustration of a system for ablating tumors, according to some embodiments. As shown in FIG. 1B, device 150 includes RF and MW generators (shown as generator 152), which are configured to produce RF and MW radiations, respectively. The respective radiations are configured to be provided to a subject's tissue 170, which harbors a tumor 172 (which in some embodiments harbors nanoparticles), by corresponding suitable RF and MW applicators (160A-160B and 154, respectively). Thermal sensors 162A and 162B are placed within the tumor and surrounding tissues, respectively, to provide real time temperature sensors. Further shown in FIG. 1B, is arm 156, which may be a manual mechanical arm or a robotic arm manipulated by the device, configured to control the microwave applicator. Additionally, illustrated in FIG. 1B is processor and display 158, configured to control the operation of the device.

Figure 2:
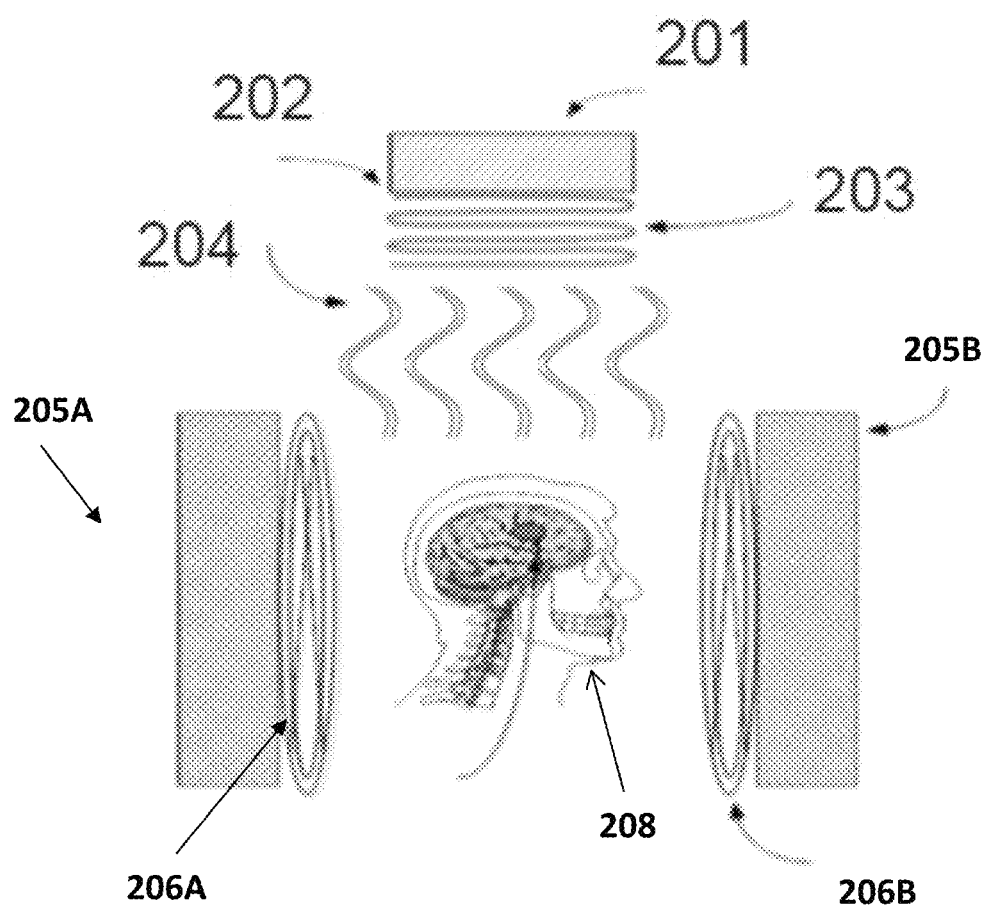
FIG. 2-A schematic close-up view illustration of elements of a treatment system, according to some embodiments.

Reference is now made to FIG. 2 which shows a schematic close-up view illustration of elements of a treatment system, according to some embodiments. As shown in FIG. 2, the Region of interest, which in this example is shown to be a tumor in a human head, is surrounding by Helmholtz coils 206A-B with an air core or a soft iron core 205A-B with high magnetic permeability placed inside coil where the coil generates magnetic field at RF energies. The upper region of the head is exposed to a microwave antenna 201 which has a radiating element 203 and a metallic back-plane 202 optimized to generate a microwave beam 204 with the highest specific loss power (SLP) in the tumor, while minimizing impact in the surrounding tissue.

Figure 3:
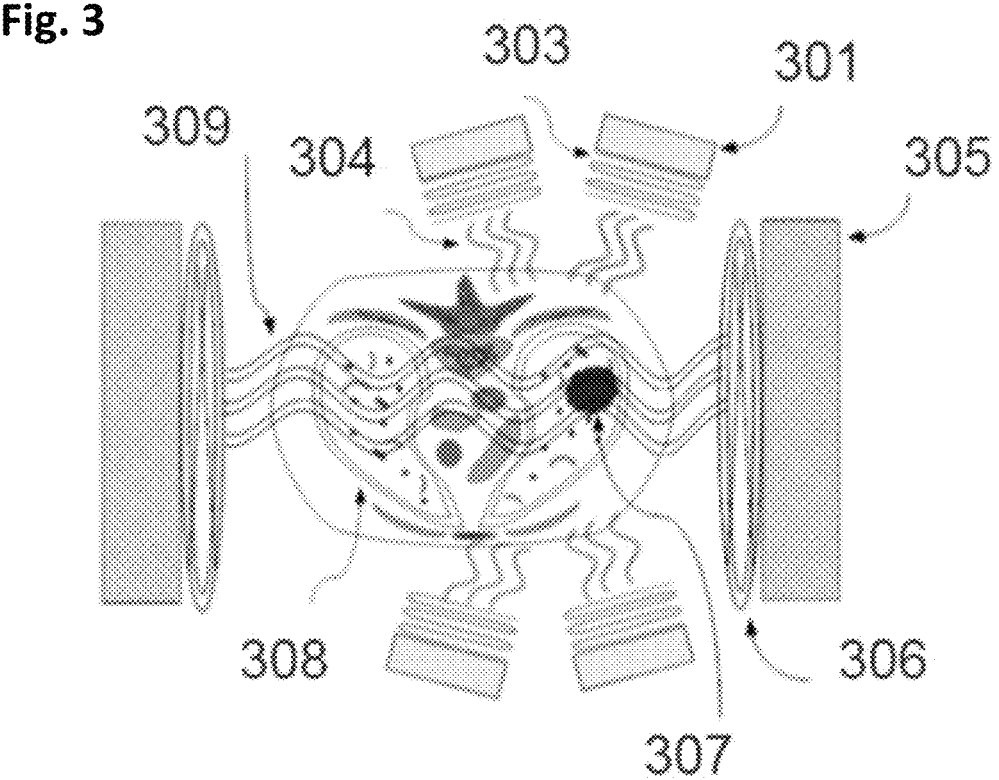
FIG. 3-A schematic close-up view illustration of RF Coils and an array of MW antennas of a treatment system, according to some embodiments.

Reference is now made to FIG. 3 which shows a schematic close-up view illustration of elements of a treatment system, according to some embodiments. The setup shown in FIG. 3 includes an array of microwave antennas 301 used to, in addition to the Helmholtz coils 306, with a medium 305 which includes of an iron core element with high permeability or air core, and is used for RF generation 309. The constructive interference of the microwave beam 304 coming from the different antennas can be used to reach harder tumor 307 locations where only one antenna would be limited by the microwave penetration depth inside the particular organ or region 308.

Figure 4:
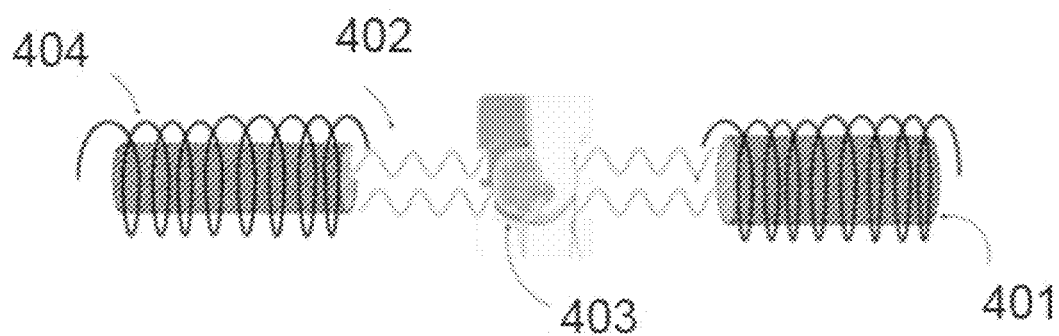
FIG. 4-A schematic illustration of RF coils setting having soft iron core of a treatment system, according to some embodiments.

Reference is now made to FIG. 4, which schematically illustrates RF coils setting of a treatment system, according to some embodiments. As shown in FIG. 4, the RF coils, may be Helmholtz coils with one RF generator or two separate solenoid coils 404 with different RF generators. When placing soft iron metal 401 with a magnetic permeability higher than that of air inside the coils, the magnetic field generated by the coils induces a magnetic field inside the soft iron core material, which then enhances the output field by a factor of k which is the magnetic permeability of the material. Therefore, by placing high magnetic permeability iron core it is possible to substantially increase the output alternating magnetic field 402 in the region of interest 403. Microwave antennas (not shown in FIG. 4) are added, as in FIGS. 2 and 3.

According to some embodiments, there is provided a device for ablation-based cancer treatment, the device comprising:

at least one Radio Frequency (RF) coil configured to generate alternating magnetic fields at RF frequencies, wherein said RF coil comprises a core material having a magnetic permeability of air or a magnetic permeability higher than air;

at least one microwave antenna configured to generate maximal specific loss power (SLP) in a tumor region of a subject and minimal SLP in a healthy tissue which is in proximity to the tumor region, wherein the RF and microwave electromagnetic waves are configured to be absorbed by metallic nanoparticles configured to selectively accumulate in the tumor regions; and a control circuitry configured to:

provide an electrical signal at RF frequencies to said RF coil, thereby define properties of the electromagnetic waves generated by said RF coil;

provide an electrical signal at microwave frequencies to said microwave antenna, thereby define properties of the electromagnetic waves generated by said microwave antenna;

obtain temperature information from a sensor located in the tumor region and from a sensor located in the healthy tissue; and adjust one or more properties of the RF and/or microwave generated electromagnetic waves based on the obtained temperature information.

According to some embodiments, there is provided a system for ablation-based cancer treatment comprising the device as disclosed herein; and one or more displays configured to display one or more operating or measured parameters of the device.

According to some embodiments, there is provided an applicator system for ablation-based cancer treatment, comprising:

an RF coil configuration to generate magnetically dominated RF fields in the waves generated by said RF coil, wherein said RF coil comprises a core comprising material having magnetic permeability higher than air;

a microwave antenna or an array of microwave antennas configured to generate maximal specific loss power (SLP) in a tumor region and minimal SLP in the healthy tissue, wherein the RF and microwave waves are configured to be absorbed by metallic nanoparticles located in the tumor, wherein the nanoparticles are configured to selectively accumulate in cancer cells/tissue/tumor;

a control circuitry configured to:

provide a radiation signal to said RF coil, thereby define properties of the radiated electromagnetic waves generated by said RF coil;

provide a radiation signal to said microwave antenna, thereby define properties of the radiated electromagnetic waves generated by said microwave antenna;

obtain temperature information from a sensor located in the tumor area and from a sensor located in the healthy tissue; and adjust one or more properties of the RF and/or microwave radiated electromagnetic waves based on the obtained temperature information.

According to some embodiments, there is provided a method for ablation treatment of cancer tumors, the method comprising:

providing Radio Frequency (RF) electromagnetic radiation and a microwave electromagnetic radiation to heat and damage localized tumors, utilizing at least one RF source and at least one microwave antenna, placed noninvasively in the vicinity of a region of a tumor of a subject, said tumor comprises nanoparticles administered to the subject;

activating the at least one RF source and the at least one microwave antenna to produce electromagnetic radiation, where the magnetic flux density of the electromagnetic radiation induced by the RF source is about 50 Gauss or more;

measuring temperature rise caused by the RF and the microwave radiation by thermal sensors placed in the tumor tissue and in a healthy tissue which is in close proximity to the tumor tissue; and adjusting the radiation parameters based on the temperature measurements such that the heating parameters, selected from temperature, power, and frequency are adjusted to allow heating the tumor tissue to a maximal specific absorption rate (SAR) and with having minimal SAR in the surrounding healthy tissue.

According to some embodiments, there is provided a method for ablation treatment of cancer tumors, the method comprising:

using RF source of electromagnetic radiation and a microwave antenna as a source of electromagnetic radiation to heat and damage localized tumors, such that the RF source and the microwave antenna are placed noninvasively in the vicinity of a region of a tumor of a subject, wherein the subject was pre-administered with nanoparticles that are configured to selectively accumulate in cancer cells/tissue/tumor;

activating the RF source and the microwave antenna so as to produce electromagnetic radiation, where the magnetic flux density of the electromagnetic radiation induced by the RF source is about 50 Gauss or more;

measuring temperature rise caused by the RF and the microwave radiation by placing thermal sensors inside the tumor and in the healthy surroundings; and controlling and optimizing the heating process through specialized algorithms that are configured to measure the temperature and the cumulative exposure minutes (CEM), the algorithms are configured to adjust the heating parameters of temperature, power, and frequency to heat the tumor to the maximal specific absorption rate (SAR) with minimal SAR in the surrounding healthy tissue.

According to some embodiments, there is provided a device essentially as disclosed herein, for use in treating cancer in a subject in need thereof.

According to some embodiments, there is provided a system essentially as disclosed herein, for use in treating cancer in a subject in need thereof.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices. Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMS, magnetic-optical disks, read-only memories (ROMS), random access memories (RAMS), electrically programmable read-only memories (EPROMS), electrically erasable and programmable read only memories (EEPROMS), magnetic or optical cards, or any other type of media suitable for storing electronic instructions, and capable of being coupled to a computer system bus. In some embodiments, a computer may include of the apparatuses may include FPGA, microcontrollers, DSP and video ICS.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 99% and 101% of the given value. In such embodiments, for example, the statement "the length of the element is equal to about 1 millimeter" is equivalent to the statement "the length of the element is between 0.99 millimeters and 1.01 millimeters".

As used herein, according to some embodiments, the terms "substantially" and "about" may be interchangeable.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What I claim is:

1. A device for ablation-based cancer treatment, the device comprising:
   at least one Radio Frequency coil configured to generate alternating RF magnetic fields;
   at least one microwave antenna configured to generate microwave electromagnetic waves which cause a maximal specific loss power in a tumor region of a subject and minimal specific loss power in a healthy tissue of the subject which is in proximity to the tumor region, wherein the RF magnetic fields and microwave electromagnetic waves are configured to be absorbed by, and thereby heat, metallic nanoparticles configured to selectively accumulate in the tumor regions; and
   a control circuitry configured to:
      provide an electrical signal at a radio frequency to said at least one radio frequency coil, to thereby define properties of the RF magnetic fields generated by said at least one radio frequency coil;
      provide an electrical signal at a microwave frequency to said at least one microwave antenna, to thereby define properties of the microwave electromagnetic waves generated by said at least one microwave antenna;
      obtain temperature information from a thermal sensor located in the tumor region and from a thermal sensor located in the healthy tissue; and
      adjust one or more properties of the RF magnetic fields and/or microwave electromagnetic waves based on the obtained temperature information, to ensure that the combination of the RF magnetic fields and the microwave electromagnetic waves cooperate to heat the tumor region to an ablative temperature without substantially heating the healthy tissue which is in proximity to the tumor region.

2. The device according to claim 1, wherein the at least one microwave antenna comprises an inductive circular loop, a flat Archimedean antenna, a spiral antenna, a zigzag antenna, a resonator antenna, or combinations thereof.

3. The device according 1, wherein the at least one microwave antenna comprises a coaxial inductive antenna that is invasive or minimally invasive.

4. The device according to claim 1, wherein an active tip of the at least one microwave antenna is configured to be placed inside the tumor.

5. The device according to claim 1, comprising an array of said microwave antennas.

6. The device according to claim 1, wherein the at least one radio frequency coil comprises a Helmholtz Coil, a solenoid Coil, a Helmholtz Coil with a soft iron core, a solenoid Coil with soft iron core, or any combination thereof.

7. The device according to claim 1, further comprising a dielectric plane placed adjacent to said at least one radio frequency coil and at least one microwave antenna and configured to reduce radiation, not directed to the target area.

8. The device according to claim 1, wherein at least one of the thermal sensors comprises a temperature optical fiber configured to measure the temperature of the tissue and provide the feedback signal to said control circuitry.

9. The device according to claim 1, wherein the RF magnetic fields and the microwave electromagnetic waves have a frequency in the range of 100 KHz to 6 GHz.

10. A system for ablation-based cancer treatment comprising the device according to claim 1; and one or more displays configured to display one or more operating parameters of the device.

11. The device according to claim 1, wherein the at least one radio frequency coil comprises a core material having a magnetic permeability of or higher than air.

* * * * *